E. P. JONES.
Wagon Brake.
No. 100,901.                                Patented March 15, 1870.
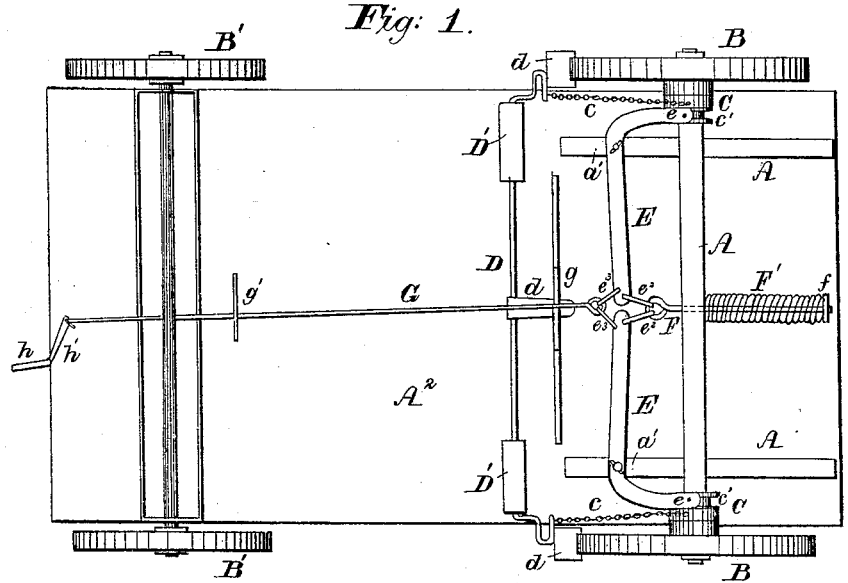
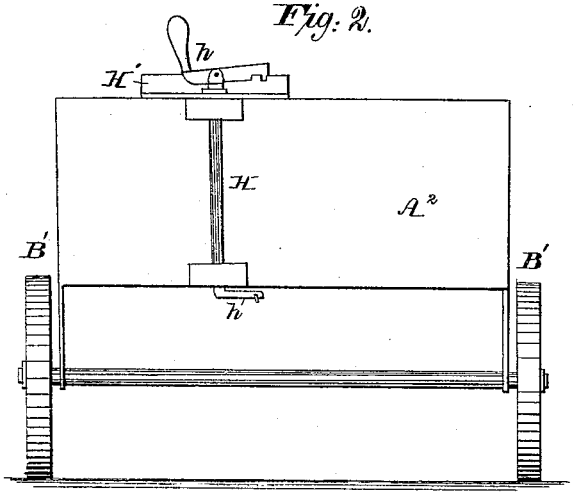
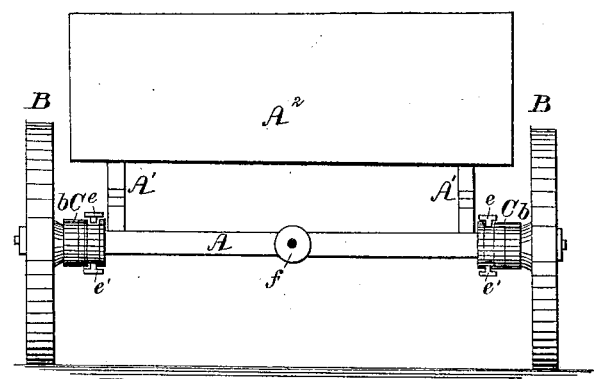
WITNESSES.                                  INVENTOR.
Edm James                                   Edward P. Jones
James L Norris                              per J. E. F. Holmead
                                                 Attorney

United States Patent Office.

EDWARD P. JONES, OF SHELL MOUND, MISSISSIPPI.

Letters Patent No. 100,901, dated March 15, 1870.

IMPROVED WAGON-BRAKE.

The Schedule referred to in these Letters Patent and making part of the same.

*To all whom it may concern:*

Be it known that I, EDWARD P. JONES, of Shell Mound Post Office, in the county of Sunflower, and State of Mississippi, have invented certain new and useful Improvements in Brakes for Carriages, Wagons, &c.; and I do hereby declare that the following is a full, clear, and exact description of the same, reference being had to the accompanying drawing and to the letters of reference marked thereon, making part of this specification, in which—

Figure 1 is a bottom view of a wagon with the brake-mechanism attached.

Figure 2 is a front view.

Figure 3 is a rear view.

The nature of my invention consists in securing on the rear axle of the wagon or other vehicle, friction-clutches or blocks. These clutches or blocks are so recessed as to conform to the contour of the inner face of the hub, which is cone-shaped. These clutches fit loosely on the stationary axle and the revolution of the wheel does not impart motion to the same except when, through the action of a spring, the toggle-arms or plates are so extended or drawn as to force the clutches, to which they are connected, in such lateral direction and to such position that the entire inner surface of their recesses shall be filled by the conical face of the hub, when, through frictional contact, they are revolved. These clutches are so connected with a brake-bar by chains or cords that their revolution winds the chains which draws the bar to such position as to bring its shoes in contact with the wheels.

This brake-bar is, however, so connected with a spring that so soon as the clutches are drawn off the hubs, or their contact with the same is broken, the tension of the spring forces the bar back to its normal position, where it is held entirely free of the wheels.

The tension of the spring that actuates the toggle-arms or plates is counteracted through the agency of a horizontal bar and a vertical lever or handle. This lever or handle is secured in a ratchet-faced guide or check-plate, and by which means the clutches are held free from contact with the hubs, and consequently the brake off.

To enable others skilled in the art to make and use my invention, I will proceed to describe its construction and operation.

A is the rear axle of a wagon or other suitable vehicle, and is attached to the spring $A^1$ and body $A^2$ in the usual manner.

B B are the wheels.

The inner face $b$ of the hub of these wheels is of a tapering or cone-shaped form, as clearly seen in fig. 3.

On the axle A are secured two friction-clutches or blocks C C. These blocks are made of wood, metal, or other suitable material, and are so attached as to allow of a free lateral movement on the axle. They are also constructed with a conical-shaped recess or opening corresponding with the form of the hub $b$, and of such dimensions as to fit as a tight cap over the same when the clutch and hub are brought together, so that, when desired, by frictional contact the clutch can be made to revolve through the action of the wheel.

D is a brake-bar, and is secured in suitable bearing-plates $D'$ $D'$ on the under side of the body $A^2$.

This bar D is provided with shoes $d$ $d$, which in their normal condition are held entirely free of the wheels B B by the tension of the spring $d'$.

This spring $d'$ is represented as a small plate-spring and is attached to the bar D, having its free end resting against the bottom of the body $A^2$. Of course any other style of spring suitable to the purpose might be substituted.

$c$ $c$ are chains or cords that connect the clutches C C and the brake-bar D.

E E are toggle arms or plates, and are pivoted at $a'$ $a'$ to the springs $A^1$ $A^1$, or other suitable supports in front and near to the axle A.

These toggle-arms or plates E E are provided with clamping-jaws $e$ $e$, and have secured on their inner face bearing-pins $e^1$ $e^1$.

These pins enter a grooved recess, $c^1$ cut in the inner face of the clutch or block C and control its action in a lateral direction, but do not impede in any manner its revolution.

These toggle-arms E E are connected by links $e^2$ $e^2$ to a short horizontal arm, F, that passes through and has its bearing in an opening in the axle A.

This bar F is provided with a bolt-head, $f$, and a coil spring $F'$. Instead of the bar or rod F being formed with a fixed head, $f$, the end of the arm may be threaded and the spring retained by a screw-nut, whereby the tension of the spring, and consequently its power, can be regulated at pleasure.

The toggle-arms E E are also connected by links $e^3$ $e^3$ to a long horizontal arm or chain, G, which runs in the opposite direction from the arm F, or toward the front of the wagon.

This arm or chain is secured on and in suitable bearings $g$ $g'$ on the under side of the wagon, and is connected with an upright or vertical lever, H.

This lever H has pivoted on its head a short handle, $h$, which is intended to act as a pawl, and by means of which, in connection with the ratchet-faced check-plate $H'$, the brake can be operated and held at any desired point, and the degree of its pressure readily regulated.

This brake is also admirably adapted for artillery purposes, and can be applied to the carriages of field, marine, and siege guns as well and with the same advantageous results as to the ordinary road vehicle.

The operation is as follows:

In fig. 1 the brake is shown as on, that is, all strain or draft is removed from the horizontal bar or chain G, and the tension of the spring F' has through the rod F so drawn the toggle-arms E E as to throw the clutches on the face $b$ of the hub, thereby causing their revolution should the wheel move.

This revolution of the clutches C C immediately winds the chains $c\ c$, which so draws the brake bar D as to bring its shoes $d\ d$ in positive contact with the wheels B B, and thus affording a powerful and almost instantaneous brake.

To free the wheels of the pressure of the brake, you have simply to turn the handle $h$ and secure it in the check-plate H', as shown in fig. 2.

This action so turns the upright arm H and throws its elbow-plate $h'$ to such position that the bar or chain G shall be drawn with such force as to overcome the power of the spring F' and cause the toggle-arms E E to be so moved that the clutches C C are removed and held entirely free of the hubs, when the spring $d'$ will immediately return the brake-bar D to such position as to leave the wheels B B entirely free from all pressure of the shoes $d\ d$.

To apply the brake again, you have simply to free the handle $h$, when through the spring F' the clutches C C are immediately thrown on the hubs, as before stated.

I have thus given a detailed description of the different features used in connection with my improved brake for carriages, wagons, &c. Many of these may be modified or varied without affecting the principle of my invention.

Having thus fully described my invention,

What I claim therein as new, and desire to secure by Letters Patent of the United States, is—

The conical hubs $b\ b$, clutches C C, chains $c\ c$, brake-bar D, toggle-arms E E, rod F, and spring F', when the same are united and arranged as shown, and are used in combination with rod or chain G, or other equivalent device for relieving the pressure of the brake, substantially as described.

In testimony whereof I have signed my name to this specification in the presence of two subscribing witnesses.

EDWD. P. JONES.

Witnesses:
B. B. LEWIS,
JNO. J. DUFF.